United States Patent [19]
Yokoyama et al.

[11] Patent Number: 5,305,030
[45] Date of Patent: Apr. 19, 1994

[54] COMBINATION OF WATER-PROOF CAMERA CASE AND DETACHABLE HAND GRIP ASSEMBLY

[75] Inventors: Hiroshi Yokoyama, Chiba; Tetsuro Fukumoto, Tokyo, both of Japan

[73] Assignee: Sony Corporation, Tokyo, Japan

[21] Appl. No.: 864,939

[22] Filed: Apr. 7, 1992

[30] Foreign Application Priority Data

Apr. 15, 1991 [JP] Japan ................................. 3-109900

[51] Int. Cl.⁵ ............................................. G03B 17/08
[52] U.S. Cl. ..................................................... 354/64
[58] Field of Search .......................... 354/64, 81, 266; 358/99

[56] References Cited

U.S. PATENT DOCUMENTS

| | | | |
|---|---|---|---|
| 3,838,434 | 9/1974 | Hughes et al. | 354/64 |
| 3,860,937 | 1/1975 | Wolff | 354/64 |
| 4,025,930 | 5/1977 | Wolff | 354/64 |
| 4,244,591 | 1/1981 | Umetsu | 354/64 |
| 4,252,426 | 2/1981 | Kuraishi | 354/64 |
| 4,441,801 | 4/1984 | Mashimo et al. | 354/266 |
| 4,864,340 | 9/1989 | Kaneko | 354/266 |
| 5,081,478 | 1/1992 | Hayashida et al. | 354/81 |

FOREIGN PATENT DOCUMENTS

| | | |
|---|---|---|
| 8000881 | 5/1980 | PCT Int'l Appl. . |
| 1525097 | 7/1977 | United Kingdom . |
| 2238136 | 5/1991 | United Kingdom . |
| 2245375 | 1/1992 | United Kingdom . |

Primary Examiner—David M. Gray
Attorney, Agent, or Firm—Ronald P. Kananen

[57] ABSTRACT

Disclosed herein is a camera case which permits underwater video shooting and which is also useful in video shooting on the ground when a hand grip assembly is detached therefrom.

In the event of underwater video shooting, a video camera 14 is placed in a main case body 10, and grips 41 and 42 are attached to the case through a link plate 43. The grip 41 has the function of a remote commander, transmitting infrared control signals from an LED to a signal receiver 35 within a transparent window 38 on the camera case 10 to operate the camera 14 accordingly. At the time of using the camera case as a dripproof case in video shooting on the ground, the link plate 43 is detached from the camera case 10, and the camera 14 in the case is operated by way of operating buttons 24 to 26 on the camera case.

5 Claims, 5 Drawing Sheets

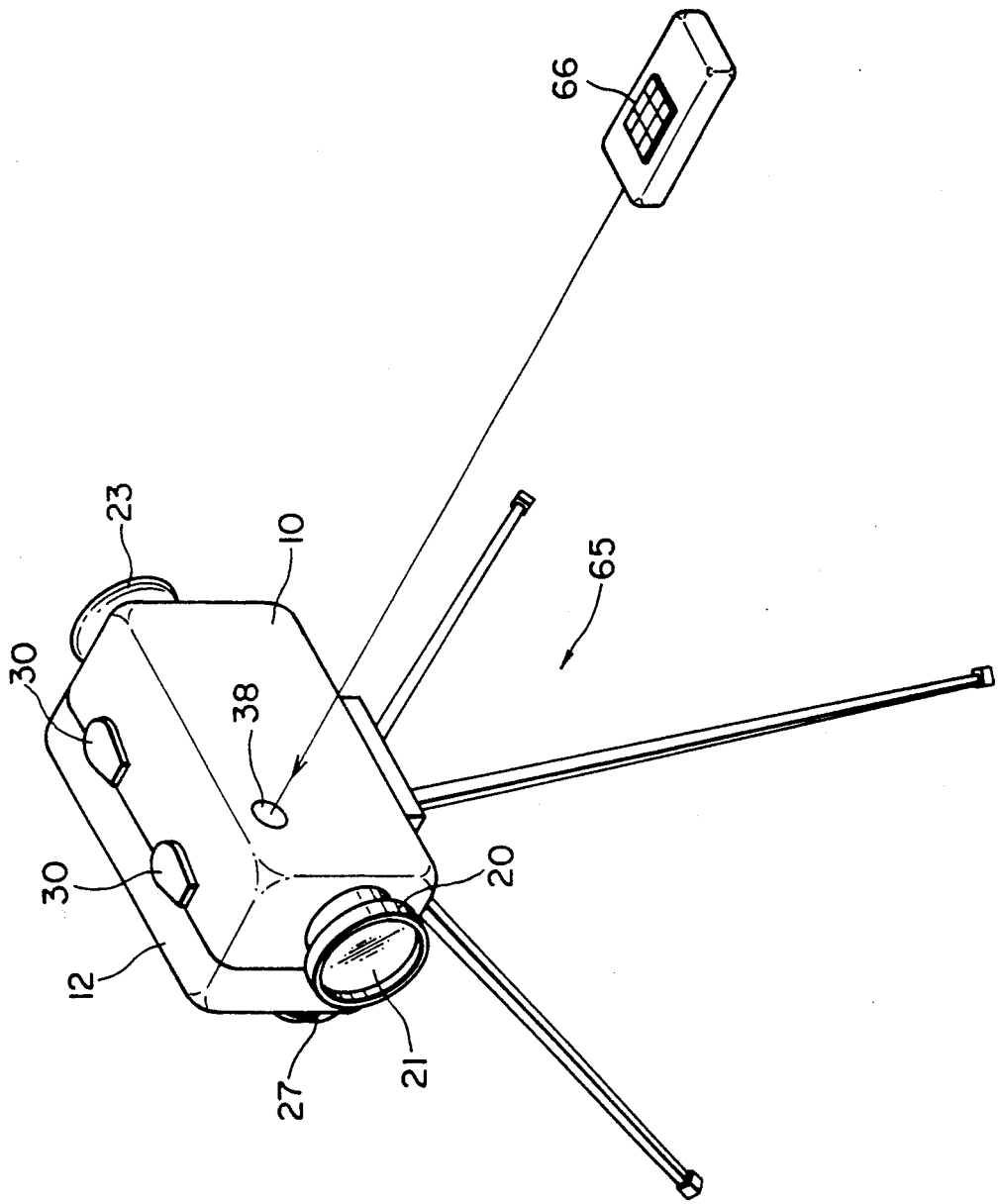

COMBINATION OF WATER-PROOF CAMERA CASE AND DETACHABLE HAND GRIP ASSEMBLY

BACKGROUND OF THE INVENTION

1. Field of the Art

This invention relates to a camera case, and more particularly to a combination of a camera case, which is adapted to accommodate a video camera in water- or drip-proof state to permit underwater video shooting, and a hand grip which is removably attachable to the camera case to guarantee underwater maneuverability of the camera.

2. Description of the Prior Art

Thanks to the success in downsizing, video cameras are increasingly used in outdoor life. It has also become fashionable to use a video camera in diversified ways, not only for taking pictures of human figures and landscapes but also for video shooting in rough or rainy weather or for underwater video shooting For example, the so-called "marine pack" of a synthetic resin material has been used as a camera case for underwater shooting. To ensure resistance to water pressure, the camera case of this sort is generally formed in a circular shape in section or in a cylindrical shape as a whole. A problem with such a camera case is that it internally contains a great deal of dead spaces. Therefore, a relatively heavy weight has to be attached to the case in order to cancel the buoyancy of the bulky marine pack. In addition, a large and heavy grip is usually attached to the marine pack thereby to control its posture under water.

Thus, the conventional camera case in the form of the so-called marine pack is too large and too heavy to serve as a handy drip-proof camera case in video shooting on the ground.

SUMMARY OF THE INVENTION

In view of the above-mentioned problems or drawbacks, the present invention has as its object the provision of a camera case which is small in size and easy to carry, as compared with the conventional counterpart, and which can serve not only as a water-proof camera case for underwater shooting but also as a drip-proof camera case for use on the ground.

According to a first aspect of the invention, there is provided a combination of a camera case adapted to accommodate a camera in water- or drip-proof state, and a hand grip assembly, comprising: means for detachably fixing a hand grip assembly to the camera case; a first operating button provided on the camera case for operating the camera in the case; and a second operating button provided on a grip portion of the hand grip assembly to perform the same function as the first operating button.

According to a second aspect of the present invention, the output of a switch associated with the second operating button is transmitted wireless to a signal reception area on the camera case or on the camera.

According to the above-mentioned first aspect of the present invention, the camera in the case can be operated not only through the first operating button on the camera case but also through the second operating button alternatively provided on the hand grip.

According to the second aspect of the invention, upon depressing the second operating button on the hand grip, the output of a switch associated with the depressed operating button is transmitted wireless to a signal reception area on the camera case or on the camera body to operate the camera in the case.

The above and other objects, features and advantages of the invention will become apparent from the following description and the appended claims, taken in conjunction with the accompanying drawings which show by way of example a preferred embodiment of the invention.

BRIEF DESCRIPTION OF THE DRAWINGS

In the accompanying drawings:

FIG. 6 is a perspective view employed to explain the manner of operating a camera on a tripod by the use of a remote commander.

DESCRIPTION OF PREFERRED EMBODIMENTS

Figure 1:
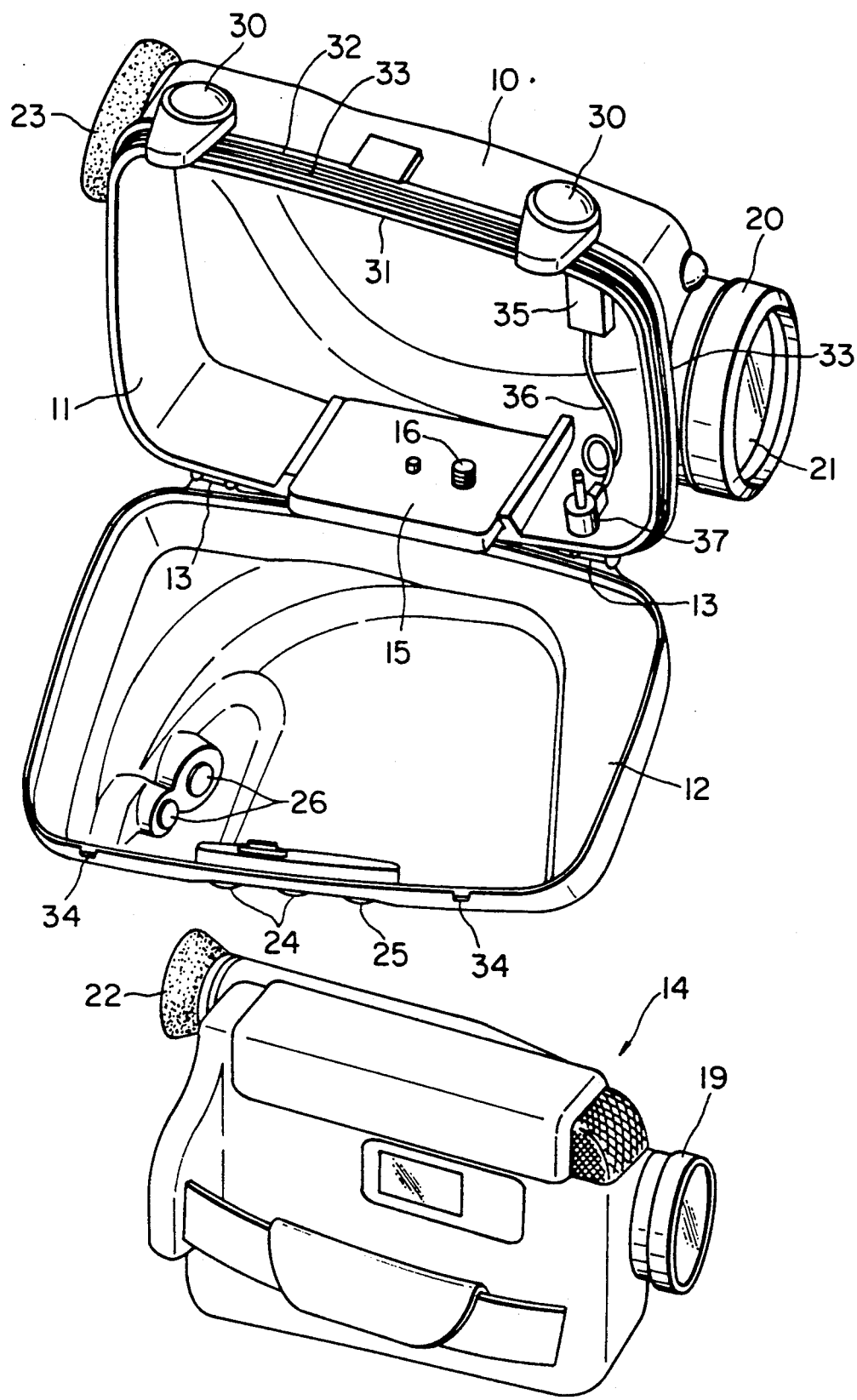
FIG. 1 is a perspective view of a camera case according to the present invention, showing the case in opened state.

Shown in FIG. 1 is an embodiment of the camera case according to the present invention, wherein indicated at 10 is a camera case body proper which is formed by die casting an aluminum alloy and which is provided with a side opening 11 at one side thereof. The side opening 11 is openably closed by a lid 12 which is formed of a material the same as or similar to that of the main case body 10. More specifically, the lid 12 is pivotally connected to the main case body 10 through hinges 13. The case 10 is adapted to accommodate a video camera 14 therein. The video camera 14 is placed on a seat 15 at the bottom of the camera case 10 and fixable to the latter by means of a stopper screw 16.

Projected forward on the front side of the video camera 14 is a lens barrel 19 which houses an optical system therein. Correspondingly to the lens barrel 19, the camera case 10 is provided with a cylindrical portion 20 with a circular transparent window 21 at the outer end thereof.

Further, the video camera 14 is provided with a rearwardly extending viewfinder 22 on one side thereof, so that one can confirm reproduced picture images through the viewfinder 22. Correspondingly to the viewfinder 22, the camera case 10 is provided with an eyepiece 23 of rubber or the like through which one can see the viewfinder 22 from outside the camera case 10.

The case 10 is further provided with a ZOOM button 24 and a FOCUS button 25 in upper portions of the lid 12 corresponding to the buttons on the video camera 14. Further, a RECORD/PLAYBACK button is attached to a rear portion of a projected wall portion of the lid 12. A grip belt 27 is removably attached to the outer side of the lid (FIG. 6).

Locking knobs 30 are attached to upper portions of the camera case 10 for interlocking engagement with the lid 12. The side opening 11 of the case 10 is hemmed with a ring-like rim 31 with a couple of rubber O-rings fitted on the circumference thereof. The above-mentioned locking knob 30 is arranged to interlockingly engage a pawl 34 which is provided opposingly in an upper portion of the lid 12, thereby to lock the lid 12 in closed state.

The case 10 is internally provided with a light-receiving portion 35 for reception of remote control signals. Connected to the light-receiving portion 35 is a cord 36 which is provided with a plug 37 at its fore end. The plug 37 is adapted to be inserted into a remote control jack on the part of the video camera 14. The case 10 is provided with a transparent window 38 in its wall portion immediately on the outer side of the light-receiving portion 35 (FIG. 2).

Figure 2:
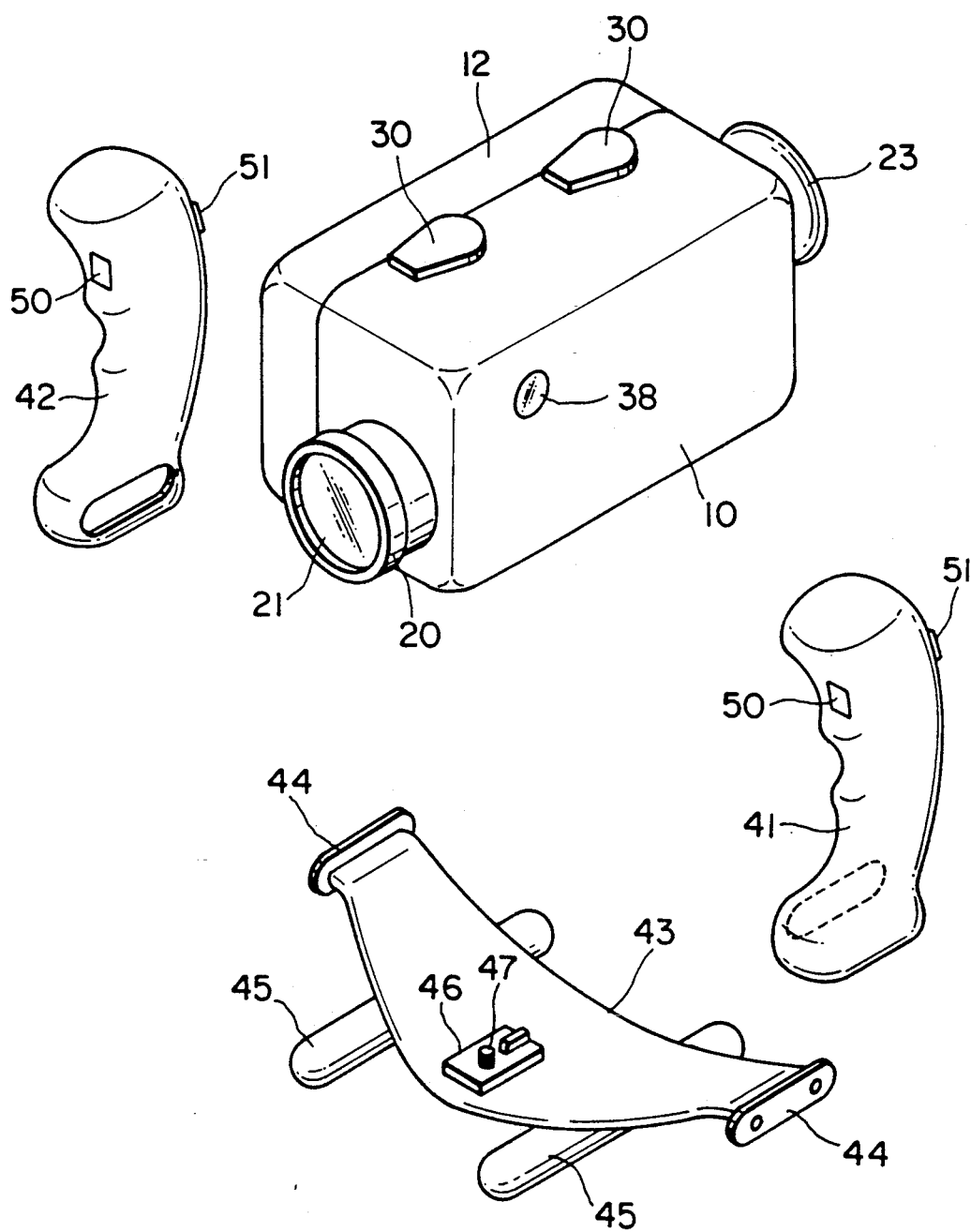
FIG. 2 is an exploded perspective view employed to explain the manner of attaching a hand grip assembly to the camera case.
Figure 3:
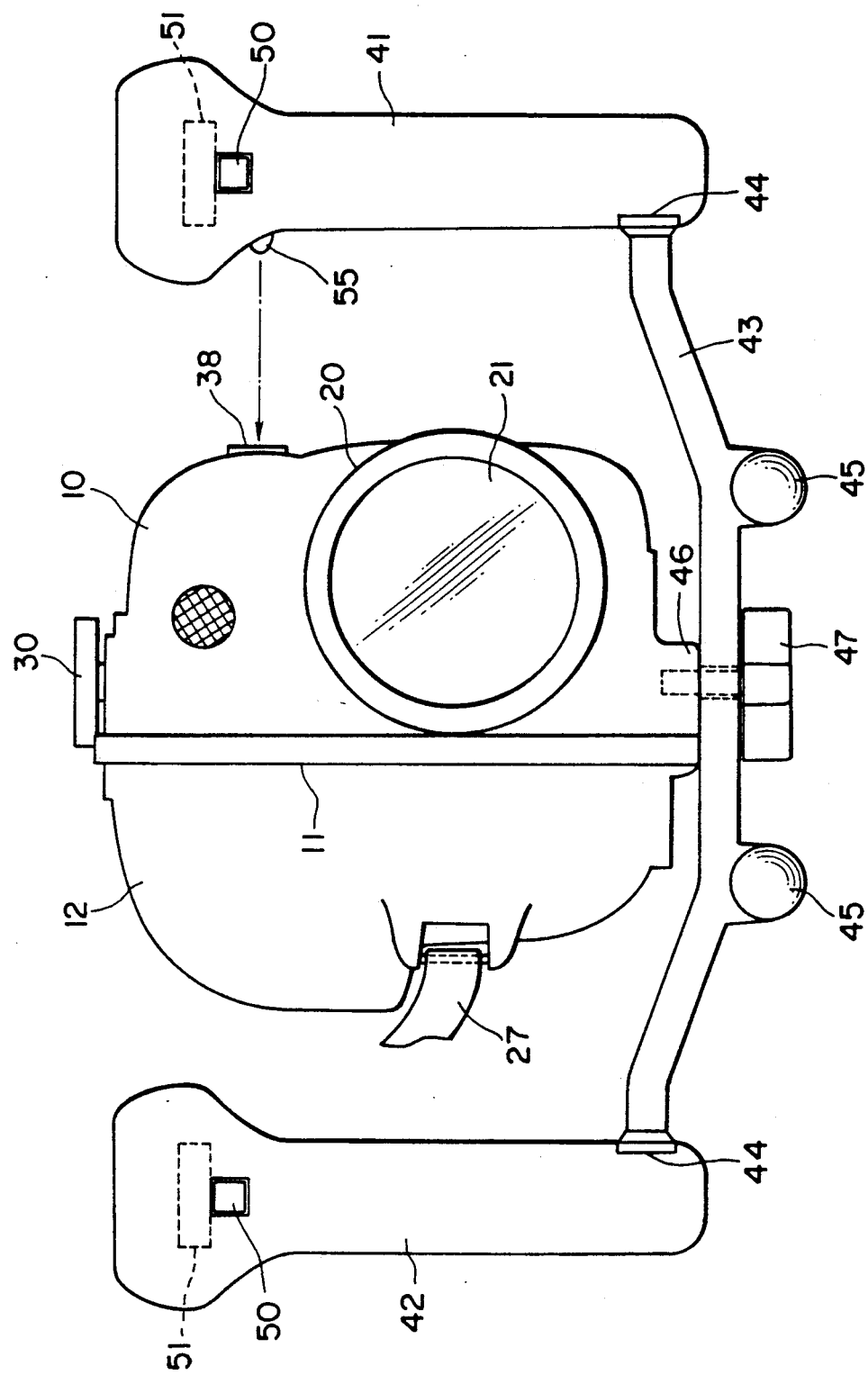
FIG. 3 is a front view of the camera case with the hand grip fixed thereto.

Referring to FIGS. 2 and 3, there is shown a grip assembly including grips 41 and 42 to be used with the camera case 10 in the event of underwater video shooting. The left and right grips 41 and 42 are fixable to grip mount portions 44 at the opposite ends of a link plate 43, which has a pair of weights 45 securely fixed to the lower side thereof. Provided on the upper side of the link plate 43 is a case mount seat 46 with a stopper screw 47.

Figure 4:
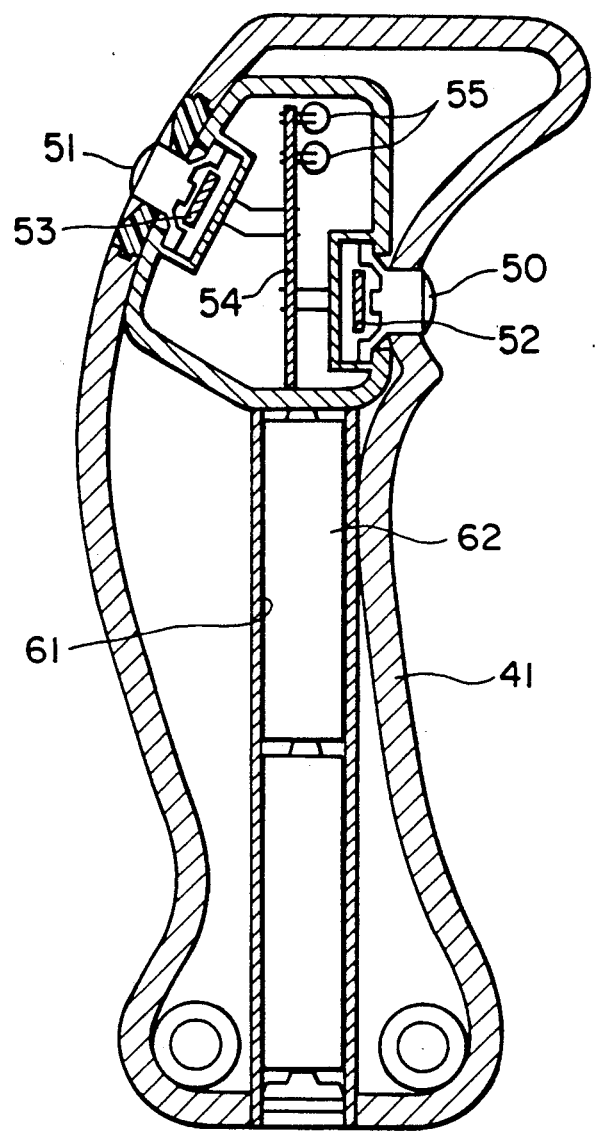
FIG. 4 is a longitudinal section of one grip.

Each of the left and right grips 41 and 42 is provided with a START (RECORDING) button 50 on the front side and a ZOOM button 51 on the rear side thereof. These operating buttons 50 and 51 are associated with corresponding switches 52 and 53, respectively. Lead wires of these switches 52 and 53 are connected to a circuit board 54 which is mounted within the grip 41 as shown in FIG. 4.

Figure 5:
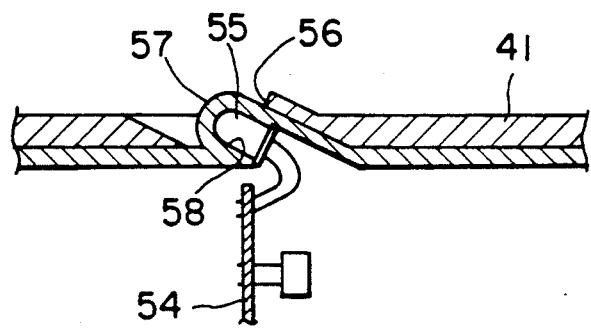
FIG. 5 is an enlarged sectional view of a mount structure for an LED which emits infrared signals.

Further, an LED 55 for transmission of remote control signals is mounted on the circuit board 54. As shown in FIG. 5, the LED is fitted in a holder portion 58 in a transparent plate 57, which is located within an opening in a side wall portion of the grip 41, so that infrared signals can be transmitted to the transparent window 30 on the case 10 through the transparent plate 57. Moreover, as shown in FIG. 4, a battery case 61 is provided within the grip 41 to accommodate a battery 62 which drives the circuit board 54.

As described hereinbefore, the camera case 10 according to the invention is formed by die casting an aluminum alloy to guarantee a higher strength as compared with the conventional marine pack of a synthetic resin material, providing a case 10 which is reduced in dimensions into a compact form substantially complementary to the complicate shape of the video camera 14. The compactness of the case 10 is reflected by less dead spaces in the case and smaller buoyancy under water. Accordingly, the invention has also succeeded in minimizing and lightening the weight 45 to be attached to the grips 41 and 42 through the link plate 43.

At the time of video-shooting underwater scenes by the use of the case 10, what is required is just to open the lid 12 of the case 10 as shown in FIG. 1, place the camera 14 in the case, fix the camera 14 to the seat 15 by tightening the stopper screw 16, and close and lock the lid 12 in closed position by the locking knobs 13.

As shown in FIGS. 2 and 3, the grips 41 and 42 are then attached to the case 10 which houses the camera 14. The grips 41 and 42 are fixable to the grip mount portions 44 on the link plate 43, while the camera 14 is fixable to the seat 46 on the link plate 43. Therefore, in case of submerged video shooting at the sea, one can hold the left and right grips 41 and 42 stably in both hands.

In addition, the grip 41 is arranged to have the functions of a remote-control commander to ensure high maneuverability. Namely, as shown in FIG. 4, START button 50 and ZOOM button 51 are provided on each of the grips 41 and 42 in association with the switches 52 or 53, the output of which is converted into an infrared signal by LED 55 on the circuit board 54. The infrared signal from LED 55 is received at the light-receiving portion 35 within the transparent window 38 on the case 10. The signal received at the light-receiving portion 35 is supplied to the remote control jack on the video camera 14 through the cord 36 and plug 37 to put the video camera 14 in the specified action.

As shown particularly in FIG. 2, the camera case 10 is detachably fixed to the link plate 43 which has the grips 41 and 42 attached to the opposite ends thereof. Therefore, the camera case 10 can be detached from the link plate 43 whenever a necessity arises. Namely, in case of video shooting on the ground, the camera case 10, detached from the link plate 43, can be used as a drip-proof case for the video camera 14.

Besides, the grip belt 27 can be removably attached to the case 10, so that, if necessary, one can hold the camera case 10 by the use of the grip belt 27 while operating the camera. The use of the case 10 in this form is extremely convenient especially in case of video shooting in the rain.

As shown in FIG. 6, the video camera in the case 10, which is set on a tripod 65, can be operated by the remote commander 66. Namely, through effective use of the light-receiving portion 35 in the transparent window 38 on the camera case 10, the video camera 14 in the case 10 can be operated by the remote commander 66.

In the foregoing embodiment, each one of the left and right grips 41 and 42 is provided with the operating buttons 50 and 51. The operating buttons 50 and 51 on the right grip 42 are connected to the circuit board 54 in the left grip 41 through lead wires which are passed through the link plate 43. Therefore, in this case the left grip 41 alone has the functions of a remote commander. However, the right grip 42 may be arranged similarly to have the functions of a remote commander if desired. Alternatively, the operating buttons may be provided only on one of the left and right grips 41 and 42, imparting the functions of remote commander only to that grip.

The above-described embodiment is arranged to receive the infrared signal from the grip 41 at the light-receiving portion 35 in the transparent window 38 on the case 10. However, arrangements may be made such that the infrared signal is directly transmitted to a light-receiving portion on the video camera 14 through the transparent window 38 in the case 10 if desired. In such a case, there is no need for providing the remote control jack on the camera 14.

According to the first aspect of the invention, a hand grip is removably attached to the camera case, and similar operating buttons are provided on both of the camera case and the hand grip. Accordingly, the camera in the case can be operated with the hand grip either in attached or detached state. It follows that, when the hand grip is attached, the camera case can serve as a water-proof camera case for use in underwater video shooting, and, when the hand grip is removed, as a drip-proof camera case, for example, for use in video shooting in the rain.

According to the second aspect of the invention, the output of the switch associated with the operating button on the grip is transmitted wireless to a signal receiving portion on the camera case or on the camera, precluding the necessity of using a connecting cord between the grip and the camera case and thus facilitating the attachment or detachment of the hand grip.

What is claimed is:

1. A combination of a camera case adapted to accommodate a camera therein in a waterproof state, and a detachable hand grip assembly, comprising:
   means for detachably fixing said hand grip assembly to said camera case;
   a first operating button provided on said camera case for operating said camera in said camera case; and
   a second operating button provided on a hand grip of said hand grip assembly to perform the same function as said first operating button.

2. A combination of a camera case and a hand grip assembly as defined in claim 1 wherein, said camera case is provided with a tapped screw hole, and said hand grip is provided with a camera mount base with a male screw, said screw hole being threadedly engageable with said male screw to fix said camera case and hand grip integrally to each other.

3. A combination of a camera case and a hand grip assembly as defined in claim 1, wherein said hand grip is provided with a switch in association with said second operating button and a transmitter adapted to generate a wireless control signal according to an input signal from said switch, and said camera case or said camera is provided with a receiver for reception of said wireless control signal.

4. A combination of a camera case and a hand grip assembly as defined in claim 3, wherein said camera case is provided with a window for transmission of infrared rays therethrough, and said wireless signal transmitter in said hand grip includes an infrared signal generator thereby to transmit infrared control signals through said window on said camera case.

5. A combination of a camera case and a hand grip assembly as defined in claim 4, wherein said window on said camera case is disposed face to face with a light emitting device of said transmitter in said hand grip.

* * * * *